(12) United States Patent
Williams et al.

(10) Patent No.: US 9,594,504 B2
(45) Date of Patent: Mar. 14, 2017

(54) USER INTERFACE INDIRECT INTERACTION

(75) Inventors: Sarah G. Williams, Seattle, WA (US); Eric Boller Fleegal, Bothell, WA (US); William Roger Voss, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 2 days.

(21) Appl. No.: 13/291,776

(22) Filed: Nov. 8, 2011

(65) Prior Publication Data

US 2013/0117715 A1 May 9, 2013

(51) Int. Cl.
G06F 3/048 (2013.01)
G09G 5/00 (2006.01)
G06F 3/041 (2006.01)
G06F 3/00 (2006.01)
G06F 17/00 (2006.01)
G06F 3/0488 (2013.01)

(52) U.S. Cl.
CPC ................................ G06F 3/04883 (2013.01)

(58) Field of Classification Search
CPC .......... G06F 3/048; G06F 3/041; G06F 17/00; G06F 3/00; G09G 5/00
USPC .......................................... 715/835; 345/173
See application file for complete search history.

(56) References Cited

U.S. PATENT DOCUMENTS 5,327,161 A  7/1994 Logan et al.
6,057,845 A *  5/2000 Dupouy ........................ 715/863
7,479,949 B2 *  1/2009 Jobs et al. ..................... 345/173
8,077,158 B2 * 12/2011 Shneidman ................... 345/173
8,745,018 B1 *  6/2014 Singleton .......... G06F 17/30899
707/705

(Continued)

FOREIGN PATENT DOCUMENTS

CN         1322341 A    11/2001
JP      2002149338 A     5/2002

(Continued)

OTHER PUBLICATIONS iPhone Users Guide, Jun. 29, 2007, pp. 1, 74, and 130.*

(Continued)

*Primary Examiner* — Jennifer To
*Assistant Examiner* — Hugo Molina
(74) *Attorney, Agent, or Firm* — Jonathan M. Waldman

(57) ABSTRACT

One or more techniques and/or systems are provided for utilizing input data received from an indirect interaction device (e.g., mouse, touchpad, etc.) to launch, engage, and/or close, etc. an object within a user interface. For example, a sensory surface of the indirect interaction device may be divided into two (or more) portions, a first portion utilized to launch, engage, and/or close an object and a second portion utilized to navigate (e.g., a cursor) within the user interface. When an object is launched based upon receipt of a predefined gesture(s), the first portion of the sensory surface may be mapped to the object to provide for interaction with the object via an interaction between a contact (e.g., finger) and the first portion. Also, the surface area of the first portion may be altered (e.g., enlarged) when it is mapped to the object and/or according to operations performed on the object.

14 Claims, 5 Drawing Sheets

(56) References Cited

U.S. PATENT DOCUMENTS

| | | | |
|---|---|---|---|
| 8,959,430 B1* | 2/2015 | Spivak | G06F 3/048 715/243 |
| 2003/0025676 A1* | 2/2003 | Cappendijk | G06F 3/04886 345/173 |
| 2006/0101350 A1* | 5/2006 | Scott | G06F 3/0481 715/779 |
| 2008/0282147 A1* | 11/2008 | Schorr | G06F 17/212 715/247 |
| 2009/0278806 A1 | 11/2009 | Duarte et al. | |
| 2010/0031202 A1 | 2/2010 | Morris et al. | |
| 2010/0031203 A1* | 2/2010 | Morris et al. | 715/863 |
| 2010/0058231 A1* | 3/2010 | Duarte | G06F 3/0481 715/800 |
| 2010/0127991 A1* | 5/2010 | Yee | 345/173 |
| 2010/0162182 A1 | 6/2010 | Oh et al. | |
| 2010/0231550 A1 | 9/2010 | Cruz-Hernandez et al. | |
| 2010/0257447 A1* | 10/2010 | Kim et al. | 715/702 |
| 2010/0273533 A1* | 10/2010 | Cho | 455/566 |
| 2010/0277422 A1* | 11/2010 | Muresianu | G06F 1/1692 345/173 |
| 2010/0295814 A1* | 11/2010 | Kent | G06F 3/044 345/174 |
| 2010/0309147 A1 | 12/2010 | Fleizach et al. | |
| 2010/0328261 A1 | 12/2010 | Woolley et al. | |
| 2011/0041096 A1 | 2/2011 | Larco et al. | |
| 2011/0055773 A1* | 3/2011 | Agarawala et al. | 715/863 |
| 2011/0080341 A1 | 4/2011 | Helmes et al. | |
| 2011/0131537 A1* | 6/2011 | Cho | G06F 3/04883 715/863 |
| 2011/0169749 A1 | 7/2011 | Ganey et al. | |
| 2011/0234503 A1 | 9/2011 | Fitzmaurice et al. | |
| 2011/0267371 A1 | 11/2011 | Song et al. | |
| 2011/0292268 A1* | 12/2011 | Mann | B62D 1/046 348/333.01 |
| 2011/0296333 A1* | 12/2011 | Bateman et al. | 715/773 |
| 2011/0314427 A1* | 12/2011 | Sundararajan | 715/863 |
| 2012/0017171 A1* | 1/2012 | Tseng | G06F 3/0488 715/794 |
| 2012/0030569 A1* | 2/2012 | Migos et al. | 715/702 |
| 2012/0038679 A1* | 2/2012 | Yun | G06F 3/1454 345/667 |
| 2012/0060103 A1* | 3/2012 | Arasaki | G06F 3/0481 715/752 |
| 2012/0139951 A1* | 6/2012 | Hwang | G06F 3/04883 345/665 |
| 2012/0198026 A1* | 8/2012 | Roy et al. | 709/218 |
| 2012/0284628 A1* | 11/2012 | Wong | H04L 67/306 715/736 |
| 2013/0007665 A1* | 1/2013 | Chaudhri et al. | 715/830 |

FOREIGN PATENT DOCUMENTS

| | | |
|---|---|---|
| JP | 2002520706 A | 7/2002 |
| JP | 2005348036 A | 12/2005 |
| JP | 2009501389 A | 1/2009 |
| JP | 2009032232 A | 2/2009 |
| JP | 2009087075 A | 4/2009 |
| JP | 2009093260 A | 4/2009 |
| JP | 2009129171 A | 6/2009 |
| JP | 2009176330 A | 8/2009 |
| JP | 2010231753 A | 10/2010 |
| JP | 2011118857 A | 6/2011 |
| KR | 20100106638 A | 10/2010 |
| WO | 00/02188 A1 | 1/2000 |

OTHER PUBLICATIONS

Kosara, Robert; "Indirect multi-touch interaction for brushing in parallel coordinates"; Jan. 24, 2011; The International Society for Optical Engineering; vol. 7868, 2011, Article No. 786809; pp. 1-9.*

Kosara, Robert, "Indirect Multi-Touch Interaction for Brushing in Parallel Coordinates", Retrieved Date: Oct. 28, 2011, http://kosara.net/papers/2011/Kosara_VDA_2011.pdf.

Schmidt; et al., "A Comparison of Direct and Indirect Multi-touch Input for Large Surfaces", Published Date: 2009, Proceedings: International Federation for Information Processing (IFIP), pp. 582-594, http://vislab.cs.vt.edu/~quek/Classes/Aware-+EmbodiedInteraction/PAPERS/SchB09-Multitouch.pdf.

Butler; et al., "SideSight: Multi-"touch" Interaction Around Small Devices", Published Date: Oct. 19-22, 2008, Proceedings: UIST'08, pp. 201-204, http://research.microsoft.com/en-us/um/people/shahrami/papers/sidesight.pdf.

"International Search Report", Mailed Date: Mar. 19, 2013, Application No. PCT/US2012/063626, Filed Date: Nov. 5, 2012, pp. 9.

Int. Preliminary Amendment cited in PCT Application No. PCT/US2012/063626 dated May 13, 2014, 5 pgs.

EP Search Report cited in EP Application No. 12847405.3 dated Jun. 23, 2015, 7 pgs.

EP Communication cited in EP Application No. 12847405.3 dated Jul. 10, 2015, 1 pg.

"First Office Action and Search Report Issued in Chinese Patent Application No. 201280054890.3", Mailed Date: Mar. 28, 2016, 15 Pages.

"Office Action Issued in Japanese Patent Application No. 2014-541143", Mailed Date: Aug. 2, 2016, 11 Pages.

"Second Office Action Issued in Chinese Patent Application No. 201280054890.3", Mailed Date: Nov. 16, 2016, 9 pages. (MS# 334645-CN-PCT).

* cited by examiner

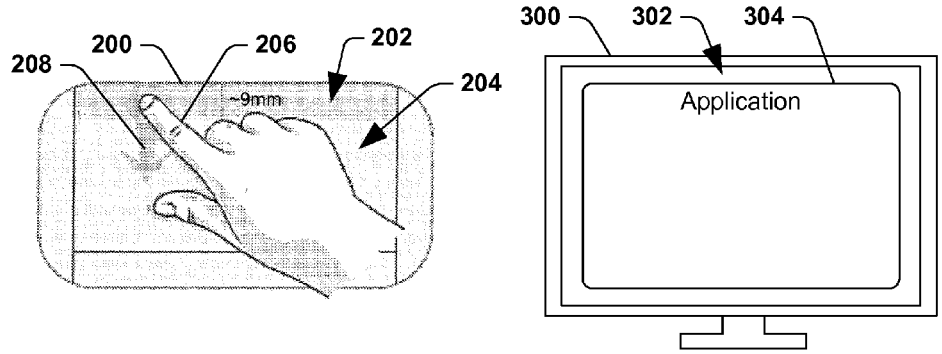
FIG. 2          FIG. 3
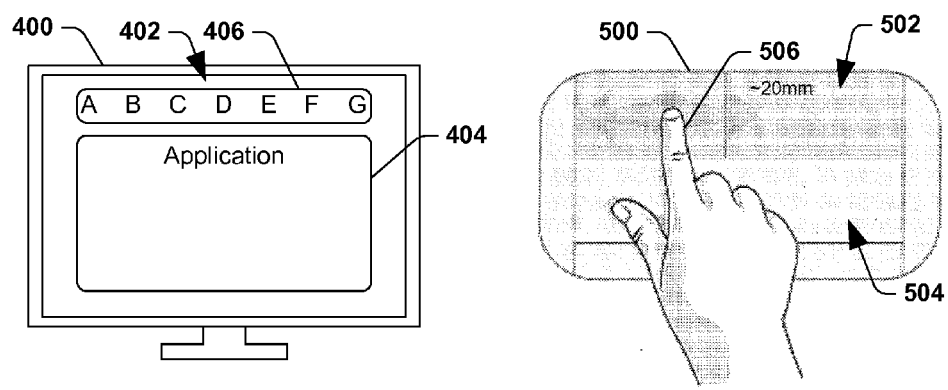
FIG. 4          FIG. 5

USER INTERFACE INDIRECT INTERACTION

BACKGROUND

Conventionally, users interact with elements of a user interface using a variety of input devices. Generally, these input devices can be classified as direct interaction devices and/or indirect interaction devices based upon the type of interaction the device has with the user interface. For example, a direct interaction device, such as a touchscreen, is configured to enable a user to interact directly with what is displayed on a monitor, whereas an indirect interaction device, such as a mouse or keyboard, for example, is configured to enable a user to indirectly interact with what is displayed on a monitor.

A mouse and devices that emulate a mouse, such as a touchpad, for example, are some of the more popular types of indirect interaction devices. The user interacts with the device, and the interaction is mapped to a position on the display. For example, a mouse may sense movement, which is mapped to a position based upon a presumed starting position and the sensed interaction with the device. A touchpad is commonly used in a manner similar to a mouse. The motion of a contact (e.g., finger, stylus, etc.) on the touchpad is sensed, and the sensed motion is treated in a manner similar to a mouse input.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for utilizing a first portion of a sensory surface of an indirect interaction device to perform a first task while a second portion of the sensory surface is utilized to perform a different task are provided. As an example, a first portion of a sensory surface may be utilized to open and/or close an object (e.g., a menu, on-screen keyboard, etc.) on a user interface of a computer system and/or to transition between objects on the user interface while another portion of the sensory surface may be utilized to navigate within the user interface. When a contact (e.g., a finger, stylus, etc.) is applied in a predefined manner (e.g., makes a particular gesture/movement and/or is applied with a specified amount of pressure, etc.), relative to the first portion of the sensory surface, a task that has been associated with the gesture may be initiated.

In one embodiment, when an object is opened/launched via input from the indirect interaction device, the two or more portions of the sensory surface may be mapped to different regions of the user interface. For example, the first portion of the sensory surface may be mapped to the launched object (e.g., or a portion of the launched object) while the second portion is mapped to the user interface more generally (e.g., so that a pointer can navigate within the user interface). Because the first portion is mapped to the object and the second portion is mapped to the user interface more generally (e.g., and includes the object), in one example, the second portion may be mapped to (e.g., overlap) a portion of the user interface that the first portion is also mapped to. For example, at least some of the second portion may be mapped to the object that the first portion is mapped to. In another embodiment, the first and second portions of the sensory surface may be mapped to different regions of the display (e.g., such that there is no overlap in the mapped regions).

In another embodiment, the relative surface areas of the first and second portions may be altered based upon initiated tasks. For example, in one embodiment, the initiation of a task based upon gestures (e.g., manners of movement) applied relative to the first portion of the sensory surface may cause an amount of surface area associated with the first portion to increase or decrease relative to the surface area associated with the second portion. By way of example, when an object is opened in the user interface (e.g., based upon a gesture applied to the sensory surface), the surface area of the first portion may be enlarged, and the enlarged first portion may be mapped to the opened object. Similarly, when an object is closed, the surface area of the first portion may be reduced (e.g., back to its initial size).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 is an exemplary sensory surface of an indirect interaction device prior to receipt of input data indicative of a predefined gesture.

FIG. 3 is an exemplary display prior to receipt of input data indicative of a predefined gesture.

FIG. 4 is an exemplary display upon receipt of input data indicative of a predefined gesture.

FIG. 5 is an exemplary sensory surface of an indirect interaction device upon receipt of input data indicative of a predefined gesture.

DETAILED DESCRIPTION

Figure 1:
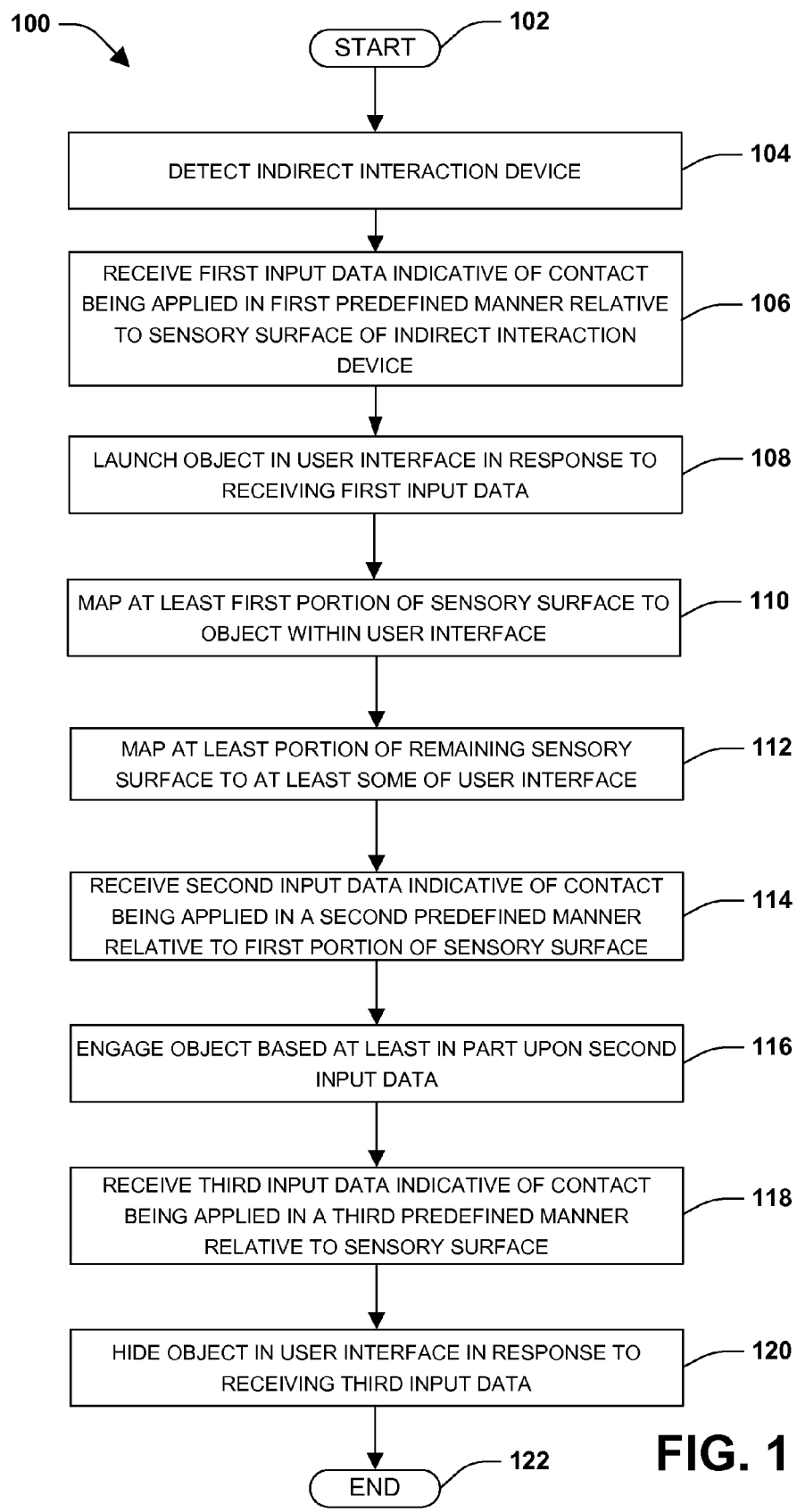
FIG. 1 is an exemplary method for utilizing an indirect interaction device to interact with a user interface.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more systems and/or techniques are provided for utilizing portions of an indirect interaction device to launch objects within a user interface of a computer system and/or for mapping portions of a sensory surface (e.g., touch-sensitive surface, heat sensitive surface, etc.) of the indirect interaction device to the object (e.g., such that the mapped portion of the sensory surface can be used to manipulate the object). For example, in one embodiment, one or more edge portions of the sensory surface may comprise an area that is sensitive to various predefined gestures (e.g., movement in predefined manner(s)) that may be made by a contact (e.g., finger, stylus, etc.) that is applied relative to the sensory surface. Upon the detection of a predefined gesture, initiated within and/or comprised within the area, for example, a task corresponding to the predefined gesture may occur. As an example of such a task, a menu of a user interface presented on a display of the computer system may launch, an on-screen keyboard may launch within the user interface, and/or a portion of the presented user interface may transition between presenting a first application and presenting a second application, for example.

Further, in one embodiment, one or more edge portions may be mapped to an object comprised within the user interface, such as the object (e.g., menu, on-screen keyboard, etc.) that was launched, based upon the detection of the predefined gesture. Thus, a user can manipulate and/or control the object using the one or more edge portions while navigating within the user interface via a second portion of the sensory surface. In one embodiment, when an edge portion of the sensory surface is mapped to an object, the edge portion of the sensory surface may be enlarged relative to its initial size (e.g., prior to the detection of the gesture). When the edge portion is no longer mapped to the object (e.g., because the object has been hidden in the user interface), its size may be reduced (e.g., back to its initial size) until a second object is launched via the edge portion (e.g., and until the edge portion gets remapped to another object, such as the second object).

While specific reference is made herein to using one or more edge portions of an indirect interaction device to launch objects, transition between applications, and/or manipulate objects, others portions of the indirect interaction device may be utilized as well or alternatively (e.g., the instant application is not meant to be limited to edge portions). Moreover, it will be appreciated that unless specifically stated otherwise, a single portion of the sensory surface may be utilized for a plurality of functions. For example, the sensory surface may comprise merely a single portion, with the single portion configured to detect predefined gestures (e.g., that may initiate specified tasks) and configured to be utilized to navigate within a user interface.

Further, to the extent the sensory surface is described as comprising a plurality of portions, it will be appreciated that it may be difficult and/or impossible for a user to visually distinguish between the plurality of portions because such portions may be comprised of substantially the same and/or similar hardware. Although, in one embodiment, the various portions may be visually distinguishable. For example, LED lighting and/or other effects may be utilized to assist a user in visually distinguishing between portions (e.g., where a first portion is lit-up differently than a second portion). Also, one or more additional and/or different types of sensors may be used in conjunction with, to supplement, etc. the sensory surface. For example, extra sensors may be located around the edge of the sensory surface to detect when a gesture begins outside the sensory surface and then enters the sensory surface (e.g., bezel sensors, optical, magnetic, electromagnetic, etc.). Such sensors may, for example, be useful to, among other things, discriminate an edge of the sensory surface from other portions of the sensory surface, to detect a contact (e.g., finger) approaching, departing, etc. the sensory surface, etc. In any of such scenarios, the sensory surface may nevertheless be said to comprise these additional, other, etc. sensors.

It may be appreciated that "indirect interaction" and/or the like are used in a broad sense herein to describe a form of interaction where an entity (e.g., user) interacts with a device other than a display to cause a user interface on the display to change. For example, a touchpad of a laptop computer may be an example of an indirect interaction device because a user may interact with the touchpad to control a pointer that is presented on the display/monitor of the laptop. It will also be appreciated that in some applications, a direct interaction device may be utilized as an indirect interaction device. As an example, where a mobile device comprising a touchscreen is utilized as a remote control for controlling a television, the touchscreen of the mobile device may be utilized as an indirect interaction device to manipulate a user interface (e.g., a target, cursor, etc. thereon) that is being displayed on the television, for example.

FIG. 1 illustrates an example method 100 for launching an object on a user interface of a computer system, engaging the launched object, and/or hiding the object (e.g., such that is it no longer presented within the user interface) using an indirect interaction device. Such a method 100 may find particular applicability to laptop and/or desktop computers that generally do not comprise a touchscreen, but it is not intended to be limited as such. For example, in another embodiment, the example method 100 may be used in conjunction with a touchscreen, where an indirect interaction device may supplement the touchscreen (e.g., such as in applications where precision that is not normally achievable via touchscreen is desired).

It will be appreciated that while the example method 100 provides for launching, engaging, and hiding an object using an indirect interaction device, one or more of these acts may be performed using techniques other than those described herein. For example, in another embodiment, the object may be hidden and/or closed automatically after a predetermined amount of time has expired and/or when another aspect of the user interface is engaged. Thus, the instant disclosure, including the scope of the claims, is not intended to be necessarily limited to including each of the acts described herein. As another example, the second input data that is received at 114 and indicative of a contact being applied in a second predefined manner relative to a first portion of the sensory surface may be utilized to engage the object and/or hide the object (e.g., thus the act described with respect to 118 may be omitted). For example, if the contact is applied in a first manner relative to the first portion of the sensory surface (e.g., the contact is applied with a specified amount of force, the contact makes a particular gesture, etc.), the object may be engaged at 116. If (e.g., instead of being applied in the first manner) the contact is applied in a second manner relative to the first portion of the sensory surface (e.g., the contact is moved in a predefined manner (e.g., the contact performs a predefined gesture), the contact applies a different amount of force to the sensory surface, etc.), the object may be hidden at 120 (e.g., bypassing the acts described at 116 and/or 118). Thus, the example method is intended to illustrate merely one example method, and a method that is actually implemented in an application may comprise additional actions that may not be described herein and/or the method described herein may comprise additional actions that may not be performed in one or more applications (e.g., acts such as 116, 118 and/or 120 (or others) may be omitted depending upon the application, implementation, configuration, etc.). Moreover, the event that occurs (e.g., whether the object is launched, engaged, and/or hidden) when input data is received may be a function of how a contact is applied relative to the sensory surface. Thus, the example method is not intended to be interpreted as necessarily describing a flow of events (e.g., because input data indicative of a gesture that is intended to cause an object to be hidden may be received before input data indicative of a gesture that is intended to cause an object to be engaged).

The example method 100 begins at 102, and an indirect interaction device that has been coupled to a computer system is detected at 104. By way of example, a touchpad may be coupled to the computer system via a wired connection (e.g., universal serial bus (USB), etc.) and/or a wireless connection (e.g., Bluetooth connection, infrared connection, etc.). Moreover, it will be appreciated that the indirect interaction device may be coupled to the computer system at the time the computer system is manufactured, and thus the indirect interaction device may be detected upon the initial boot-up of the computer system, for example. Alternatively, the indirect interaction device may be coupled to the computer system by the end-user, for example, and may be detected upon the indirect interaction device being coupled and/or upon a subsequent reboot, for example.

Upon detection of the indirect interaction device, the computer system and/or a component thereof may be configured to install drivers that are configured to provide for the transference of data between the indirect interaction device and the computer system and/or otherwise prepare the computer system for interaction with the indirect interaction device and/or vice-versa, for example.

The example method 100 also comprises receiving first input data indicative of a contact being applied in a first predefined manner relative to the sensory surface of the indirect interaction device at 106. By way of example and not limitation, input data may be received that indicative of a contact moving in a predefined manner (e.g., performing one or more predefined gestures), indicative of a contact applying a particular amount of pressure relative to the sensory surface, etc. It will be appreciated that for purposes of brevity, gesture and/or the like may be used herein to describe a contact being applied relative to the sensory surface. Use of such a term is not intended to imply a particular type of application, such as movement, but it used more generally to refer to a contact being applied relative to a sensory surface.

As an example, a table or other data structure may comprise a plurality of gestures that have been predefined (e.g., by a user, application developer, computer manufacturer, etc.) to trigger particular tasks/events within the user interface. For example, such tasks/events may comprise, among other things, opening an object in a user interface, closing an object, transitioning between applications presented in the user interface, transitioning between objects presented in the user interface, etc. While input data indicative of gestures that have not been predefined may also be received (e.g., by a computer system to which the indirect interaction device is operable coupled), such input data may be utilized for other purposes (e.g., such as for navigating within the user interface (e.g., similar to a mouse pointer navigating within a user interface)).

Predefined gestures may include, among other things, rotating the contact in a particular manner (e.g., clockwise, counter-clockwise, etc.), changing the direction of a contact's movement in a particular manner, beginning and/or ending the gesture in a particular region/portion of the sensory surface, applying specified amount of force, touching a particular portion of the sensory surface, beginning the gesture outside of the sensory area but ending inside, beginning the gesture inside of the sensory area but ending outside, etc. As an example, the sensory surface may be divided into two or more portions (e.g., prior to receiving the first input data). A first portion may be utilized to trigger some event in the user interface (e.g., such as initializing a launch of one or more objects and/or closing an object in the user interface), and a second portion may be utilized for some other function/purpose, such as to navigate within the displayed user interface, for example. Thus, gestures that occur within, begin within, and/or end within the first portion of the sensory surface may trigger some event in the user interface, while gestures that occur within, begin within, and/or end within the second portion of the sensory surface may be utilized to navigate a target (e.g., pointer) within the user interface, for example.

At 108 in the example method 100, an object is launched in a user interface in response to receiving the first input data (e.g., at 106). That is, when the received input data is indicative of a gesture that corresponds to launching an object, the object may be launched (e.g., opened) in the user interface. Such an object may include, among other things, a menu, an on-screen keyboard, and/or other user interface feature that was not displayed (e.g., or was not actively displayed (e.g., because it was at least partially obscured)) prior to receiving the first input data, for example. In this way, an indirect interaction device may be utilized to open a menu and/or on-screen keyboard, for example, that appeared closed (e.g., and/or otherwise inactive) in the user interface prior to receipt of the first input data, for example.

At 110 in the example method 100, at least a first portion of the sensory surface of the indirect interaction device is mapped to the launched/opened object presented within the user interface (e.g., using absolute mapping, relative mapping, and/or other mapping techniques). That is, stated differently, at least a portion (e.g., which may comprise all or less than the entire sensory surface) of the sensory surface is mapped to the object. In this way, when a contact is applied to the first portion of the sensory surface, the object may be engaged. By way of example, the object may comprise a menu comprising five selections (e.g., 5 buttons). The first portion of the sensory surface may therefore be divided into five sections, and respective sections may be mapped to one of the five selections, for example. Subsequently, when a contact is applied relative to one or more of the five sections, the one or more selections corresponding to the section(s) to which the contact is applied may be selected and/or distinguished in the user interface (e.g., by highlighting the selection), for example. It will be appreciated that such a feature may be further illustrated with respect to FIGS. 2-7.

Absolute mapping techniques are generally configured to scale an axis of the indirect interaction device to a corresponding axis of a display and/or a particular object(s) within the display (e.g., when a portion of the indirect interaction device is merely mapped to an object(s)). For example, an x-axis of the indirect interaction device may be scaled with a corresponding x-axis of the display/object such that, in the x-direction, respective points on a sensory surface of the indirect interaction device map to merely one point (e.g., or a specific number of points) on the display/object. Similarly, a y-axis of the indirect interaction device may be scaled with a corresponding y-axis of the display/object such that, in the y-direction, respective points on the sensory surface of the indirect interaction device map to merely one point (e.g., or a specific number of points) on the display/object. Conventionally, touchscreens and/or pen digitizers have utilized absolute mapping techniques.

Relative mapping techniques are different than absolute mapping techniques in that the sensory surface is generally mapped to a moveable subregion of a display/object (e.g., which may not be shown to a user). That is, the mapping is a function of a present location of a target (e.g., pointer) on the display/object at the time a contact (e.g., finger) is detected by the sensory surface and may change based upon a change in a location of the target. For example, where the target is centered in an upper right quadrant of the display/object when a contact is detected, the sensory surface may be mapped such that a center point of the sensory surface corresponds to a location of the target (e.g., causing less than all of the display/object to be mapped to points on the sensory surface) (e.g., merely the upper right quadrant of the display/object may be mapped, for example. If no contact is detected by the sensory surface for a period of time, when a contact is again detected, the mapping may be altered such that the position of the target is mapped to a center point of the sensory surface, for example. Conventionally, mice and/or mice-emulating trackpads have utilized relative mapping techniques.

If at least some of the sensory surface is not mapped to the launched object, the remaining portion (e.g., or at least a portion of the sensory surface that was not mapped to the object at 110) may be mapped to the user interface using one or more mapping techniques (e.g., absolute mapping, relative mapping, a combination of absolute and relative mapping, etc.) at 112 in the example method. Typically, the remaining portion is mapped to portions of the user interface that do not comprise the object (e.g., to which the first portion was mapped at 110), although in one embodiment, the second portion may be at least partially mapped to the object. For example, the second portion may be mapped to the entire user interface. Because the object is comprised within the user interface, the second portion may be at least partially mapped to the object (e.g., although at least some of the second portion may be mapped to portions of the user interface that do not comprise the object, unless the object fills the display). In this way, a target (e.g., pointer) may maneuver over the object based at least in part upon input data indicative of a contact applied relative to the second portion, and the object may be engaged based at least in part upon input data indicative of the same and/or a different contact applied relative to the first portion.

It will be appreciated that by mapping the second portion of the sensory surface to the user interface, the second portion may be utilized to navigate the user interface and/or perform some other function while the first portion that is mapped to the object may be (concurrently) utilized to engage the object, for example. That is, stated differently, the first portion of the sensory surface (e.g., mapped to the object at 110) may be utilized to navigate and/or engage the object while the second portion of the sensory surface may be (concurrently) utilized to navigate and/or engage other portions of the user interface and/or may be utilized to perform some other function (e.g., serve as an enter, select, return, etc. button or key when tapped).

At 114 in the example method 100, second input data indicative of a contact being applied in a second predefined manner relative to the first portion of the sensory surface is received, and the object is engaged at 116 based at least in part upon the second input data. For example, as described above, the object launched/opened at 108 may comprise five selections (e.g., five buttons), and the first portion of the sensory surface may be divided into five sections, with respective sections corresponding to one of the five selections. The second input data may be indicative of a contact being applied relative to one or more of those five sections, and based upon the second input data, selections corresponding to the sections to which the contact was applied may be engaged, for example.

It will be appreciated that in the claims and/or throughout the description, the terms first, second, third, etc. may be used to distinguish between elements. However, such terms are not intended to imply that an object/feature is unique and/or to imply a temporal order. For example, a statement may provide for, among other things, receiving first input data indicative of a first contact being applied relative to the sensory surface and receiving second input data indicative of a second contact being applied relative to the sensory surface. Unless otherwise explicitly stated, the first and second contacts may be the same contact and/or the first contact may be different than the second contact (e.g., such that the first and second contacts are unique contacts).

It will be appreciated that while specific reference is made herein to receiving second input data and/or using the second input data to engage the object, other input data (e.g., which does not engage the object may also be intermittently received). For example, where the sensory surface comprises first and second portions, input data may also be received indicative of one or more contacts being applied relative to the second portion. Such input data may be utilized to, among other things, navigate a target (e.g., pointer) within the user interface and/or to engage other aspects/objects of the user interface, for example.

At 118 in the example method 100, third input data indicative of a contact being applied in a third predefined manner relative to the sensory surface of the indirect interaction device is received, and the object is hidden/closed in response to receiving the third input data at 120. For example, in one embodiment, an object (e.g., which was launched at 108) may be hidden and/or closed when a contact performs a gesture that is opposite to the gesture that caused the object to launch at 108, although other types of gestures may cause the object to be hidden (e.g., such that it is at least partially obscured) and/or closed. By way of example, where an object is launched/opened based upon a one or more contacts moving away from an edge of the sensory surface, an object may be hidden/closed by a contact moving toward a same and/or different edge of the sensory surface. As another example, a contact applied relative to a first edge of the sensory surface may cause an object to launch at 108 while a contact (e.g., the same contact and/or a different contact) applied relative to a second edge of the sensory surface may cause the object to be hidden/closed at 120.

It will be appreciated that there are numerous gestures that are contemplated that may be applied to a sensory surface of an indirect interaction device to illicit the launch and/or engagement of an object and/or to illicit an object to be hidden/closed. The foregoing gestures and the gestures described below are merely intended to provide examples of some of the virtually countless gestures that can be applied, and the instant disclosure, including the scope of the claims, is not intended to be limited to specific gestures/movements described herein to the extent practical.

Moreover, while reference has been made throughout the example method to receiving input data indicative of a contact being applied relative to the sensory surface, the input data may also and/or instead be indicative of a plurality of contacts being applied relative to the sensory surface. Further, in one embodiment, different tasks may occur if input data is indicative of a plurality of contacts as opposed to merely one contact. For example, input data indicative of a gesture that was performed by merely one contact (e.g., one finger) may cause a first object to launch while input data indicative of a similar gesture that was performed with two contacts may cause the first object to be hidden/closed and/or may cause a second object, different than the first object, to launch. Further, a contact need not actually "contact" a sensory surface to be applied relative thereto. For example, a contact may be applied relative to a sensory surface by merely coming close to the sensory surface where the sensory surface is heat sensitive, magnetic, conductive, etc.

The example method 100 ends at 122.

FIGS. 2-5 illustrate an example embodiment for opening an object (e.g., menu) and/or engaging the object via an indirect interaction device. More particularly, FIG. 2 illustrates an example sensory surface 200 (e.g., touchpad, heat sensitive surface, etc.) prior to the generation of first input data (e.g., which may be received at 106 in the example method 100 of FIG. 1). FIG. 3 illustrates an example display 300 prior to the generation of the first input data. FIG. 4 illustrates an example display 400 (e.g., 300 in FIG. 3) after first input data has been received (e.g., from an indirect interaction device comprising the sensory surface) and an object 406 (e.g., menu) has been launched (e.g., at 108 in the example method 100 of FIG. 1). FIG. 5 illustrates an example sensory surface 500 (e.g., 200 in FIG. 2) after first input data has been received and a portion 502 of the sensory surface has been mapped to the object 406 (e.g., at 110 in the example method 100 of FIG. 1), such as to an example user interface 402 presented on the display 400 in FIG. 4.

As illustrated in FIG. 2 and as further described with respect to the example method 100 of FIG. 1, in one embodiment, the sensory surface 200 may be comprised of two or more portions (e.g., which may or may not be visually (and/or otherwise) distinguishable). For purposes of clarity, in the illustrated embodiment, a first portion 202 is filled in a darkened grey pattern, while a second portion 204 is not filled.

Prior to launch of the object (e.g., at 108 in the example method 100 of FIG. 1), the first portion 202 may comprise a relatively small portion of a total surface area of the sensory surface 200. For example, in the illustrated embodiment, the first portion 202 consumes merely the top 9 mm of the sensory surface.

When a first contact 206 (e.g., a finger) is applied relative to the sensory surface 200, input data indicative of a location where the first contact 206 is applied and/or indicative of movement of the first contact 206 relative to the sensory surface 200 may be generated by the indirect interaction device (e.g., and received by the computer system at 106 in the example method 100 of FIG. 1). Such input may be used to navigate a target (e.g., pointer) within the user interface and/or to initiate a task/event (e.g., such as the launch of an object, for example).

A computer system receiving such input data may comprise a set of predefined gestures, and the input data may be compared to the set of predefined gestures to determine whether the input data is indicative of a gesture that corresponds to a predefined gesture. If the input data is indicative of the first contact 206 substantially performing one or more of the predefined gestures, the computer system and/or a portion thereof may initiate a task/event associated with the predefined gesture that corresponds to gesture indicated by the input data (e.g., such as opening a menu, closing a menu, opening an on-screen keyboard, transitioning between applications presented in the user interface, etc.).

By way of example, the computer system may provide that a menu and/or on-screen keyboard is to launch if received input data is indicative of a contact being applied to the first portion 202 of the sensory surface 200 and being dragged downward (e.g., towards the second portion 204 of the sensory surface 200) as illustrated by the arrow 208 in FIG. 2. If input data is received indicative of the first contact 206 performing such a gesture, the computer system and/or a portion thereof may initiate the event associated with the corresponding predefined gesture (e.g., launch the menu and/or on-screen keyboard). If input data is received indicative of the first contact 206 being applied to the first portion 202, but performing some other gesture, a different event may be initiated and/or no event may be initiated depending upon whether the gesture corresponds to a predefined gesture in a database of the computer system, for example.

Further, it will be appreciated that if input data is instead and/or also indicative of the first contact 206 and/or another contact being applied to the second portion 204, the computer system may utilize the input data to perform other functions. For example, in one embodiment, input data indicative of a contact(s) applied to the second portion 204 may be utilized to navigate a target (e.g., mouse pointer) within the user interface and/or to engage other objects/aspects that are presented within the currently displayed user interface (e.g., the second portion may be utilized in a manner similar to the way touchpads are conventionally utilized).

FIG. 3 illustrates an example display 300 (e.g., monitor) of a computer system comprising a user interface 302 that may be presented on the display 300 prior to the initiation of a task/event (e.g., launch of a menu) that may occur when input data indicative of a contact (e.g., 206 in FIG. 2) performing a predefined gesture is received from an indirect interaction device (e.g., at 106 in the example method 100 of FIG. 1)). It will be appreciated that as illustrated, the user interface 302 is substantially comprised of an application 304.

FIG. 4 illustrates an example display 400 (e.g., 300 in FIG. 3) of a computer system comprising a user interface 402 (e.g., 302 in FIG. 3) after input data indicative of a predefined gesture has been received from the indirect interaction device (e.g., at 106 in the example method 100 of FIG. 1). For example, upon receiving input data indicative of a contact (e.g., 206 in FIG. 2) swiping from the top edge of a sensory surface (e.g., from the first portion 202 of the sensory surface 200 in FIG. 2) and/or entering the sensory surface 200 from the top edge, a menu 406 may be opened in the user interface 402. The menu 406 may comprise one or more of items that may be selected and/or engaged. For example, the illustrated menu 406 comprises the items A, B, C, D, E, F, and G. It will also be appreciated that because of the incorporation of the menu 406 into the user interface based upon the received input data, the portion of the user interface 402 representing an application 404 (e.g., 304 in FIG. 3) may be reduced relative to its size when the menu 406 was not present (e.g., as illustrated in FIG. 3).

As described with respect to act 110 in the example method 100 of FIG. 1, at least a portion of the sensory surface may be mapped to the menu 406 opened in the user interface 402. In this way, a user may engage the menu 406 (e.g., or selections thereof) using the sensory surface.

FIG. 5 illustrates an example sensory surface 500 (e.g., 200 in FIG. 2) comprising a first portion 502 (e.g., 202 in FIG. 2) that may be mapped to the menu 406 and/or may be configured to be utilized to engage the menu 406 (e.g., at 116 in the example method 100 of FIG. 1) and/or other objects that may be launched based upon received input data indicative of a predefined gesture(s). As an example, a contact 506 (e.g., 206 in FIG. 2) may interact with the first portion 502 of the sensory surface 500 to engage the menu 406 in FIG. 4. For example, the contact 506 may select item A of the menu 406 by applying the contact 506 to a section of the first portion 502 that is mapped to item A (e.g., a left edge section of the first portion 502).

In one embodiment, as a contact(s) is applied to the first portion 502 of the sensory surface 500, an item(s) within the menu 406 and/or other objects that are engaged by the contact being applied to a particular area of the first portion 502 may be distinguished (e.g., highlighted, bolded, etc.) relative to other aspects of the menu 406. For example, if the contact 506 is applied to a section of the first portion 502 that is mapped to item A, item A may be highlighted and/or otherwise distinguished relative to the other items in the menu 406. In this way, a user may be aware of what item is being engaged, for example. Also, when a portion of the sensory surface is mapped to an object or portion thereof, a target (e.g., pointer, etc.) may not be needed (e.g., may be omitted because it may be redundant) where the object (e.g., a portion or the entirety thereof) is configured to provide a visual or other indication of a contact being applied to a corresponding portion of the sensory surface.

Portions of the sensory surface 500 that are not mapped to the menu 406, for example, may be utilized to perform other functions. For example a second portion 504 (e.g., 204 in FIG. 2) may be utilized to navigate within the user interface 402 and/or to engage other objects/aspects besides and/or including the menu 406. For example, the second portion 504 of the sensory surface 500 may be utilized to navigate a target (e.g., mouse pointer) within the application 404 and/or may be utilized to engage aspects of the application 404 (e.g., in a manner similar to a manner in which conventional touchpads would interact with a user interface 402).

Moreover, as illustrated by comparing FIG. 2 with FIG. 5, in one embodiment, a surface area of the first portion 502 and/or the second portion 504 of the sensory surface 500 may be adjusted when an object is launched, hidden, and/or otherwise manipulated (e.g., based upon input data received from the indirect interaction device). For example, as illustrated in FIG. 2, prior to receiving the first input data indicative of a predefined gesture, the first portion 202 of the sensory surface 200 was defined as the top 9 mm of the sensory surface 200. As illustrated in FIG. 5, after the first input data was received and a menu 406 was opened based upon the received input data, the first portion 502 of the sensory surface 500 was defined as the top 20 mm of the sensory surface 500. Thus, surface area of the first portion 506 was enlarged relative to its size prior to receiving the first input data (e.g., as illustrated in FIG. 2). Similarly, a surface area of the second portion 504 of the sensory surface 500 was reduced relative to its size prior receiving the first input data (e.g., as illustrated in FIG. 2) to accommodate an expansion of the first portion 502.

It will be appreciated the FIGS. 2-5 are merely intended to provide one example of how an object may be launched and/or engaged using a sensory surface of an indirect interaction device and is not intended to be interpreted in a limiting manner. For example, in one embodiment, a plurality of edges of a sensory surface may respectively comprise portions for launching/opening and/or engaging a launched/opened object. For example, the top, bottom, left, and/or right edges of the sensory surface may comprise portions for launching and/or engaging an object. Moreover, the placement of the object in the user interface and/or the type of object that is engaged may depend upon, among other things whether a contact engages a left, right, top, or bottom edge of the sensory surface and/or the type of gesture that is received. For example, in one embodiment, the placement of the object in the user interface may correspond to an edge with which the contact(s) interacted. As an example, if the contact(s) was applied relative to the left edge, the object may be placed on a left edge of the user interface and/or if the contact(s) was applied relative to the bottom edge, the object may be placed on a bottom edge of the user interface.

It will also be appreciated that while FIG. 5 illustrates less than all of the sensory surface 500 being mapped to the launched object (e.g., menu 406 in FIG. 4), the amount of the sensory surface 500 that is mapped to the launched object may depend upon, among other things, the type of object that is launched. For example, in one embodiment, an entity (e.g., user, developer, etc.) may define one or more gestures that are configured to launch an on-screen keyboard. Although such a keyboard may not comprise the entire user interface that is presented on the display, it may be desirable to map substantially all of the sensory surface to the keyboard (e.g., to provide sufficient space for a user to select respective keys of the on-screen keyboard using the indirect interaction device). In such an embodiment, little if any of the sensory surface may therefore be utilized to navigate the user interface while the on-screen keyboard is launched (e.g., the first portion 502 of the sensory surface 500 may comprise substantially all of the sensory surface 500, with the second portion 502 comprising little, if any, of the sensory surface 500 while the on-screen keyboard is displayed within the user interface).

In one example, when an on-screen keyboard and/or other object is closed or hidden in the user interface (e.g., based upon received input indicative of another predefined gesture), the portion of the sensory surface that was mapped to the object (e.g., 502 in FIG. 5) may be unmapped. Moreover, where the mapped portion (e.g., 502 in FIG. 5) was enlarged or otherwise adjusted based upon the object (e.g., menu 406 in FIG. 4) being launched, the surface area of the portion of the sensory surface that was mapped to the object may be readjusted. For example, in one embodiment, the surface area of the mapped portion may be returned to the size it was prior to the object being enlarged (e.g., reducing the first portion 506 in FIG. 5 from the top 20 mm of the sensory surface 500 to merely the top 9 mm as illustrated in FIG. 2).

Figure 6:
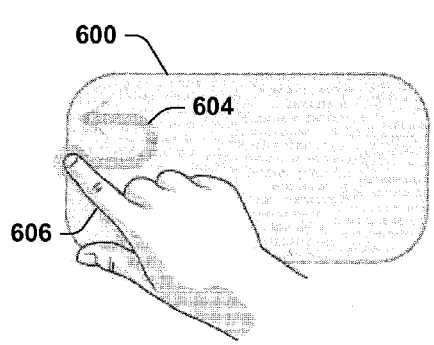
FIG. 6 is an exemplary sensory surface of an indirect interaction device upon receipt of input data indicative of a predefined gesture.
Figure 7:
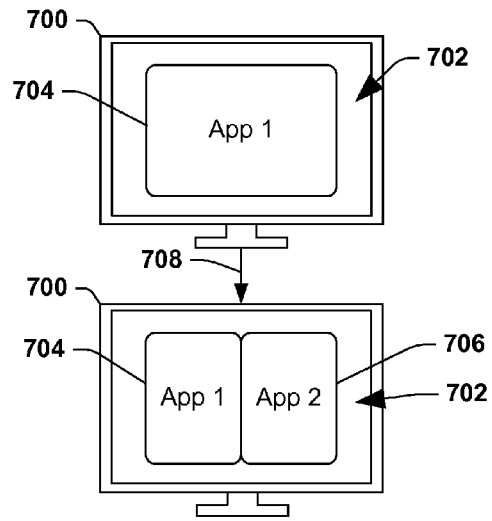
FIG. 7 is an exemplary display upon receipt of input data indicative of a predefined gesture.

FIGS. 6 and 7 illustrate yet another task/event that may be initiated based at least in part upon the receipt of input data from an indirect interaction device and indicative of a contact 606 (e.g., 506 in FIG. 5) performing a predefined gesture/movement relative to a sensory surface 600 (e.g., 500 in FIG. 5) of the indirect interaction device. More particularly, FIGS. 6 and 7 illustrate an example technique for utilizing an indirect interaction device for transitioning between applications 704, 706 (e.g., 404 in FIG. 4) and/or other objects that may be presented in a user interface 702 (e.g., 402 in FIG. 4) that is displayed on a display 700 (e.g., 400 in FIG. 4).

It will be appreciated that while FIG. 6 does not illustrate first and second portions of the sensory surface 600, in one embodiment, the sensory surface 600 may comprise first and second (e.g., and/or other) portions similar to those illustrated in FIGS. 2 and 5. For example, a left edge of the sensory surface 600 (e.g., where the contact is being applied) may comprise a thin strip (e.g., 9 mm wide) that is configured to be utilized to determine when to transition between applications. As described in FIGS. 2 and 5, the remaining surface area of the sensory surface 600 (e.g., if any) may be utilized to perform some other function (e.g., such as to navigate within the user interface 702 in FIG. 7 and/or engage aspects of the user interface 702).

FIG. 6 illustrates the contact 606 performing a u-shaped gesture (e.g., as illustrated by the arrow 604). As described above, it will be appreciated that the gesture(s) that may be performed to initiate a particular event may depend upon, among other things, user preference, developer specifications, etc. For example, the user may specify that receipt of input data indicative of a u-shaped gesture initiating on a left edge of the sensory surface 600 is to trigger the transition between two or more applications on the user interface 702 that is being displayed. However, other gestures for transitioning between applications and/or other objects that may be presented on the user interface 702 are also contemplated. For example, in one embodiment, input data indicative of a u-shaped gesture may be configured to cause a split screen of two applications 704, 706 whereas a simple left-to-right movement of the contact 602 across the sensory surface 600 may cause the user interface 702 to transition from displaying a first application 704 to displaying a second application 706.

Upon receipt of input data indicative of the u-shaped gesture and/or other predefined gesture, a corresponding event may be initiated. For example, as illustrated in FIG. 7, receipt of input data indicative of the u-shaped gesture may trigger a computer system to transition (e.g., as represented by an arrow 708) the user interface 702 from displaying merely a first application 704 to displaying a split screen of the first application 704 and a second application 706. In this way, an indirect interaction device may be utilized to transition between applications 704, 706 and/or other objects that may be presented on a user interface 702, for example.

Figure 8:
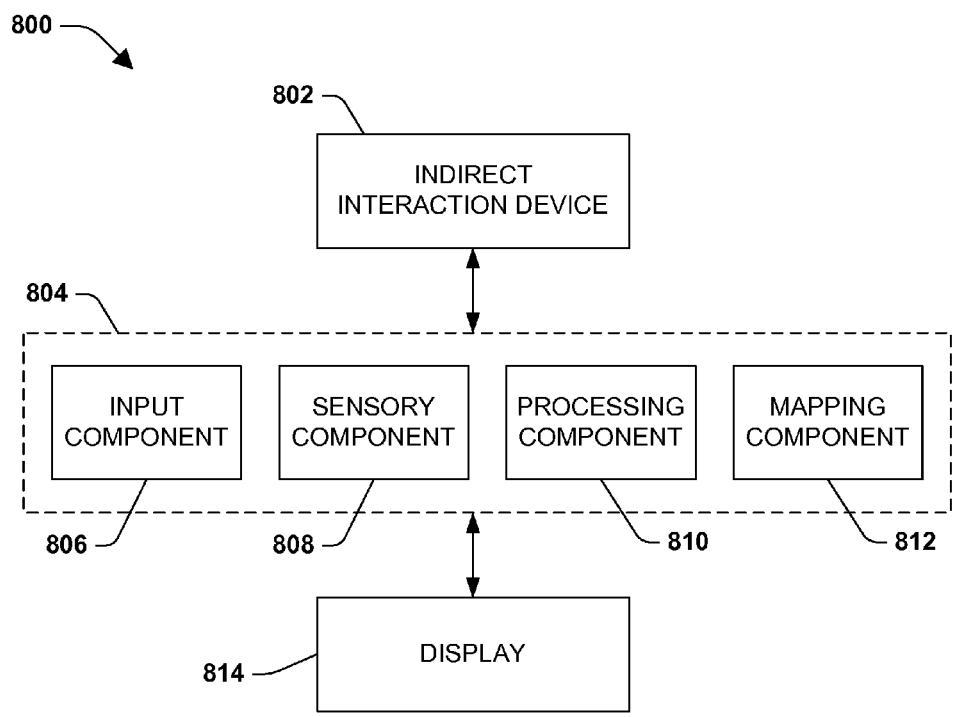
FIG. 8 is an exemplary system for utilizing an indirect interaction device to interact with a user interface.

FIG. 8 illustrates a component block diagram of an example environment 800 for an indirect interaction system 804. More specifically, FIG. 8 illustrates an example environment 800 of a system 804 configured to provide for utilizing an indirect interaction device 802 to launch (e.g., open), engage, and/or close one or more object comprised on a user interface that is presented on a display 814. By way of example, the system 804 may be utilized to open and/or close an on-screen keyboard and/or a menu and/or to transition between applications presented within the user interface. Such a system may find particular applicability with respect to personal computers and/or other computing environments were utilizing an indirect interface device 802 (e.g., mouse, touchpad, etc.) may be useful.

The example system 804 comprises an input receiver component 806 that may be configured to receive input from the indirect interaction device 802. As an example, the indirect interaction device 802 (e.g., which may comprise a touch sensitive surface, such as a touchpad, a heat sensitive surface, etc.) may be configured to detect particular types of interactions with a contact (e.g., finger, stylus, etc.) and/or to translate those interactions into input data. Such input data may provide information regarding (e.g., indicative of), among other things, a location of the contact(s) applied relative to the sensory surface, movement of a contact(s) if one or more contacts are moved relative to the sensory surface, etc., for example.

The example system 804 also comprises a sensory component 808. The sensory component 808, which may comprise hardware and/or software implemented at least in part via hardware, is configured to cause a sensory surface of the indirect interaction device 802 to comprise at least first and second portions. That is, stated differently, the sensory component 808 is configured to cause input data indicative of a contact(s) applied to a first portion of the sensory surface to be treated differently than input data indicative of a contact(s) applied to a second portion of the sensory surface (e.g., in essence causing the sensory surface to be divided into two or more portions respectively configured to serve different functions). For example, in one embodiment, a first portion (e.g., 202 in FIG. 2) of the sensory surface may be configured by the sensory component 808 to be utilized to alter a user interface in response to detecting one or more predefined gestures performed by a first contact(s) applied relative to the first portion. A second portion (e.g., 204 in FIG. 2) of the sensory surface may be configured to be utilized for some other function. As an example, the second portion may be configured by the sensory component 808 to be utilized to navigate within the user interface.

By way of example and not limitation, when an indirect interaction device 802 is coupled to a computer system and/or sometime thereafter, the sensory component 808 may be configured to divide a sensory surface of the indirect interaction device 802 into two or more portions. It will be appreciated that such a division may or may not be known to the indirect interaction device 802. As an example, when input data is received by the input data component 806, a determination may be made regarding whether such data is indicative of a contact being applied to a first portion or a second portion, for example, of the sensory surface. In such an embodiment, it may not be necessary and/or desirable to provide the indirect interaction device 802 with information regarding the division of the sensory surface into two or more portions. Rather, the division may be utilized during the processing of data received from the indirect interaction device 802, for example. However, in other embodiments, it may be advantageous to provide information regarding the division of the sensory surface into two or more portions to the indirect interaction device 802. For example, using such information, the indirect interaction device 802 may change a visual appearance of the sensory surface, audio interaction (s) with the sensory surface, etc. (e.g., so that a user is aware of such divisions).

It will also be appreciated that while FIG. 8 illustrates the sensory component 808 as being comprised within the system 804, in another embodiment, the sensory component 808 may be comprised within the indirect interaction device 802. In such an embodiment, the indirect interaction device 802 may independently (e.g., and/or with input from the system 804) divide the sensory surface of the indirect interaction device 802 into two or more portions, for example.

Respective portions of the sensory surface are configured to be utilized to perform different functions (e.g., although their functions may overlap). As an example, input data received by the input data component 806 indicative of an interaction(s) between one or more contacts (e.g., fingers, styli, etc.) and the sensory surface that initiated within, ended within and/or was comprised within a first portion (e.g., one or more edge portions) of the sensory surface may be utilized to alter the user interface (e.g., open/close a menu and/or onscreen-keyboard, to transition between applications and/or other objects that may be presented within a user interface, and/or to initiate some other event/task), for example. Input data received by the input data component 806 indicative of an interaction(s) between one or more contacts and the sensory surface that initiated within, ended within, and/or was comprised within a second portion of the sensory surface (e.g., as specified by the sensory component 808) may be utilized to navigate and/or engage objects presented within the user interface, for example.

It will be appreciated that the particular events/tasks that are triggered by the receipt of input data indicative of a contact(s) interacting with the first portion may be depend upon, among other things, user specifications, developer specifications, manufacturer specifications, etc. As an example, the system 804 may comprise a database (not shown) comprising one or more predefined gestures (e.g., predefined interactions between the contact(s) and the sensory surface) and an associated event/tasks to be performed if input data is indicative of one or more of the predefined gestures.

The system 804 of the example environment 800 also comprises a processing component 810 configured to, among other things, process input data received by the input data component 806. For example, the processing component 810 may be configured to determine whether the input data is indicative of an interaction that occurred in the first and/or second portions of the sensory surface. If the interaction occurred in the second portion, the processing component 810 may be configured to perform the one or more functions of the second portion based at least in part upon the received input data. For example, where the second portion is configured to be utilized to navigate a user interface presented on the display 814, the processing component 810 may be configured to maneuver a target (e.g., mouse pointer) about the user interface.

If the interaction at least partially occurred in the first portion, the processing component 810 may be configured to determine if the input data is indicative of a gesture that is intended to initiate a specified event/task. As an example, the processing component 810 may compare the input data to the database comprising information indicative of one or more defined gestures to determine whether the input data is indicative of a gesture that has been predefined. If the input data is indicative of a gesture that has been predefined, the processing component 810 may identify an event that is associated with the gesture indicated in the input data and perform the identified event. By way of example, the processing component 810 may be configured to launch one or more objects (e.g., open a menu and/or an on-screen (e.g., piano) keyboard), transition between two or more objects (e.g., applications) configured to be displayed in the user interface, and/or close/hide one or more objects (e.g., closing a menu and/or on-screen keyboard).

In one embodiment, when an object is launched via an interaction that occurs on the indirect interaction device 802 (e.g., when input data indicative of a predefined gesture is received), the object may be mapped to at least a portion of the sensory surface via a mapping component 812 of the example system 804. For example, in one embodiment, the mapping component 812 may be configured to map the object to a first portion of the sensory surface (e.g., as defined by the sensory component 808) (e.g., as described in more detail with respect to FIGS. 2-5). In this way, a contact may engage aspects of the launched object via the first portion of the sensory surface, for example.

As described above with respect to FIG. 5, it will be appreciated that when a portion of the sensory surface is mapped to an object, it may be desired to adjust a surface area of one or more portions of the sensory surface to accommodate the mapping. For example, in one embodiment, the first portion may (e.g., prior to the launch/opening of the object) merely comprise a top 9 mm of the sensory surface. Such a small amount of surface area may make it difficult for a user to interact with aspects of the mapped object via the first portion. Therefore, in one embodiment, the sensory component 808 may alter the surface area of at least one of the first and second portions when an object that is to be mapped to a portion of the sensory surface is launched. For example, when an object is launched based upon input data indicative of a predefined gesture, the sensory component 808 may be configured to enlarge the surface area of the first portion while reducing the surface area of the second portion (e.g. so that the total area of the surface remains constant). In this way, the mapping component 812 may map the object to a larger portion of the sensory surface (e.g., relative to its size prior to the object being opened).

It will be appreciated that when the object that is mapped to a portion of the sensory surface is closed and/or hidden, the surface area of the first and/or second portions may be adjusted again by the sensory component 808, for example. As an example, when an object is closed, the surface area of a portion of the sensory surface that was mapped to the object may be adjusted (e.g., reduced) to its size prior to the launch of the object.

Figure 9:
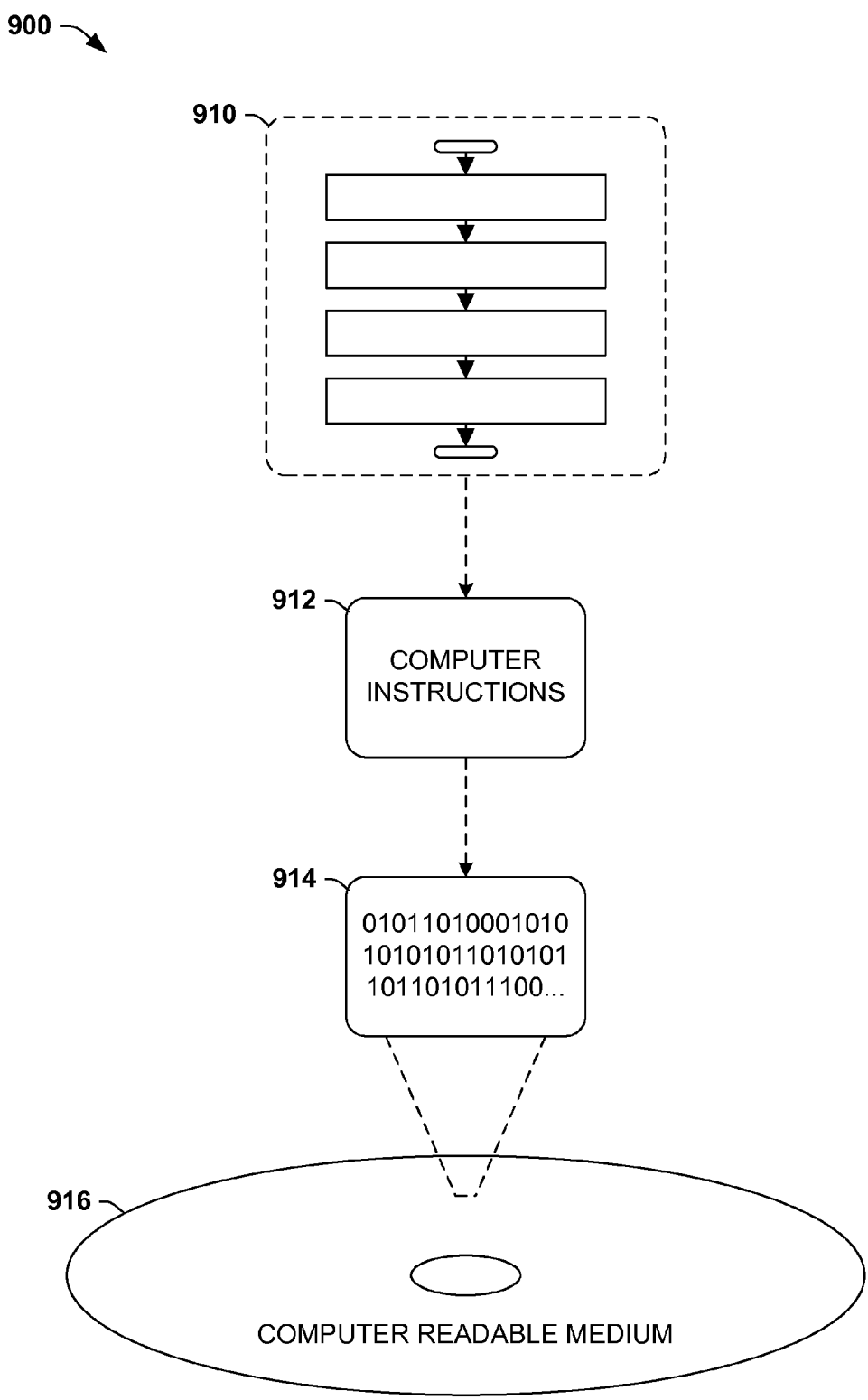
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as at least some of the exemplary method 100 of FIG. 1, for example. In another such embodiment, the processor-executable instructions 912 may be configured to implement a system, such as at least some of the exemplary system 800 of FIG. 8, for example. Many such computer-readable media 916 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
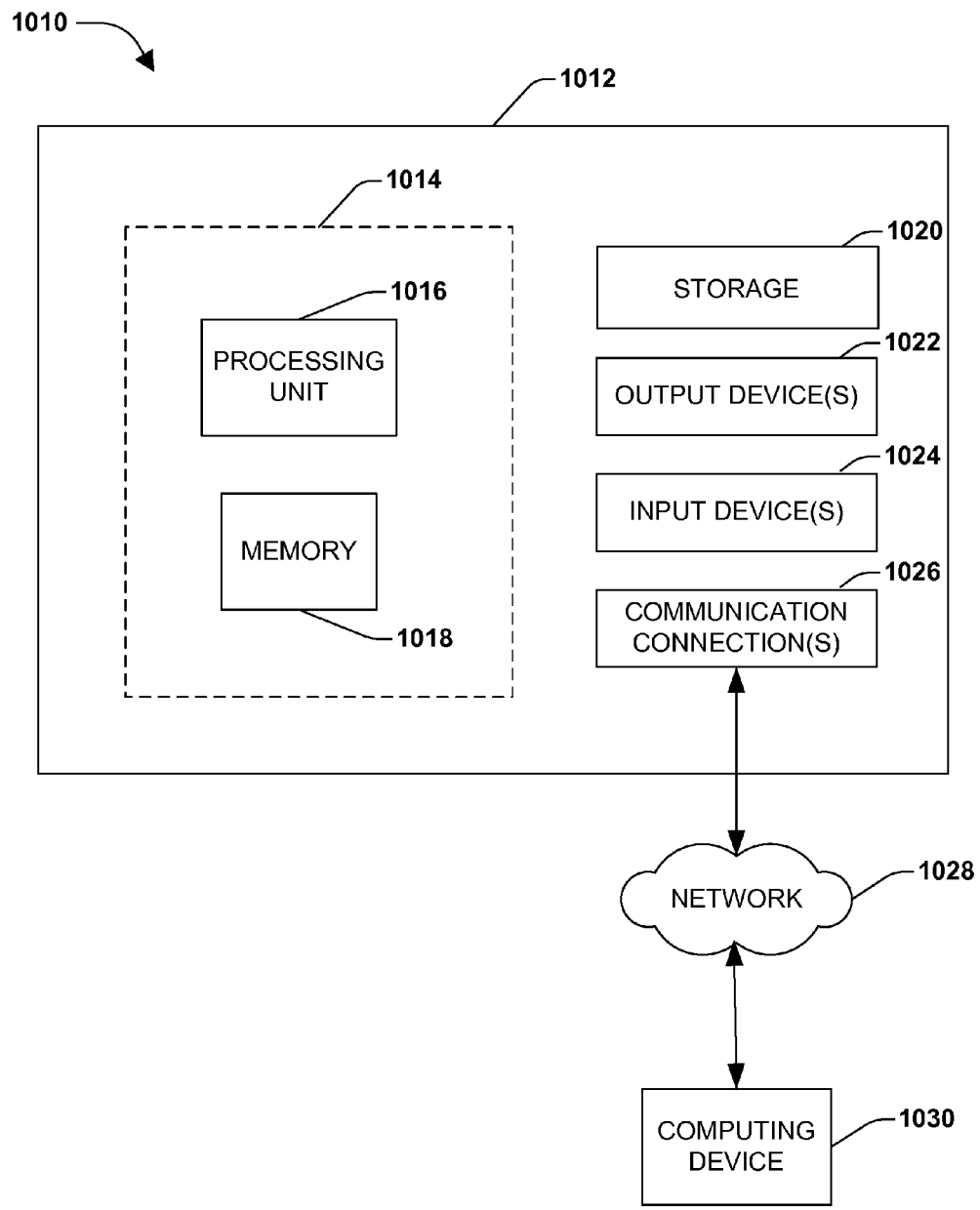
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example), or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
 receiving, in a indirect interaction device configured to facilitate interactions with a user interface, a first input data indicative of a first gesture being applied in a first portion of a sensory surface of the indirect interaction device, the sensory surface comprising the first portion and a second portion, the first portion having a first area prior to receiving the first input data and the second portion having a second area prior to receiving the first input data, where the first input data indicates a location on the indirect interaction device at which the first gesture was applied;
 responsive to receiving the first input data:
  launching, on the display, a menu comprising a plurality of selections; and
  expanding the first area to create an expanded first area and reducing the second area to create a reduced second area,
  where the menu is launched at a location on the display that corresponds to the location on the indirect interaction device at which the first gesture was applied,
  where the size of the expanded first area varies directly with and depends on the size of the menu, and
  where the size of the reduced second area varies inversely with and depends on the size of the expanded first area; and
 wherein the first portion of the sensory surface is mapped to a first launched object and the second portion of the sensory surface is mapped to a second object that is different than the first launched object, and wherein the amount of the sensory surface that is mapped to the launched object is based in part on the type of object that is launched.

2. The method of claim 1, where the reduced second area is configured to receive inputs to navigate within an application whose output is displayed on the display and to engage the application.

3. The method of claim 2, where in response to receiving the first input data, the expanded first area is mapped to the menu such that at a first time an interaction with the expanded first area causes an operation to be performed on the menu and at the first time an interaction with the reduced second area causes an operation to be performed on the application.

4. The method of claim 1, where the indirect interaction device is a phone and where the display is part of a television, a tablet computer, a laptop computer, or a desktop computer.

5. The method of claim 1, comprising partitioning the expanded first area into a plurality of sub-partitions that correspond to the plurality of selections.

6. The method of claim 1, comprising:
 receiving a second input data indicative of a contact being applied in the expanded first area; and
 engaging the menu based at least in part on the second input data.

7. The method of claim 5, where the size and location of a member of the plurality of sub-partitions is determined by the size and location of a corresponding member of the plurality of selections.

8. The method of claim 1, where at least some of the reduced second area is not mapped to the menu.

9. The method of claim 1, comprising:
 receiving a second input data indicative of a second gesture being applied to the expanded first portion; and
 upon determining that the second gesture is the opposite gesture of the first gesture, removing the menu from the display.

10. The method of claim 9, where the first gesture is a swipe in from an edge of the indirect interaction device and the second gesture is a swipe out to the edge of the indirect interaction device.

11. The method of claim 1, where the first portion is initially as long as an edge of the indirect interaction device and extends in 9 mm from the edge.

12. The method of claim 1, where the expanded first portion is as long as an edge of the indirect interaction device and extends in 20 mm from the edge.

13. The method of claim 1, where the second object comprises a portion of the user interface that does not comprise the first launched object.

14. An indirect interaction device comprising:
one or more processing units; and
a memory that stores instructions that when executed by at least one of the one or more processing units, perform a method comprising:
receiving a first input data indicative of a first gesture being applied at a first location in a first portion of a sensory surface of the indirect interaction device, the sensory surface comprising the first portion and a second portion, the first portion having a first area prior to receiving the first input data and the second portion having a second area prior to receiving the first input data;
receiving a second input data indicative of a second gesture being applied to the expanded first portion;
responsive to receiving the first input data:
launching a menu having a plurality of selections on a user interface displayed on a display located on a device other than the indirect interaction device; and
expanding the first area to create an expanded first area and reducing the second area to create a reduced second area, and
responsive to receiving the second input data:
upon determining that the second gesture is the opposite gesture of the first gesture, removing the menu from the display,
where the menu is launched at a location on the display that corresponds to the first location,
where the size of the expanded first area varies directly with and depends on the size of the menu,
where the size of the reduced second area varies inversely with and depends on the size of the expanded first area,
where the reduced second area is configured to receive inputs to navigate in an application whose output is displayed on the display,
where the expanded first area is partitioned into a plurality of sub-partitions that correspond to the plurality of selections,
where members of the plurality of sub-partitions are mapped to the corresponding members of the plurality of selections so that a touch of a member of the plurality of sub-partitions causes selection of the corresponding member of the plurality of sub-partitions, and
where the size and location of a member of the plurality of sub-partitions is determined by the size and location of a corresponding member of the plurality of selections; and
wherein the first portion of the sensory surface is mapped to a first launched object and the second portion of the sensory surface is mapped to a second object that is different than the first launched object, and wherein the amount of the sensory surface that is mapped to the launched object is based in part on the type of object that is launched.

* * * * *